United States Patent
Lee et al.

(10) Patent No.: US 10,847,793 B2
(45) Date of Patent: Nov. 24, 2020

(54) NEGATIVE ACTIVE MATERIAL FOR RECHARGEABLE LITHIUM BATTERY AND RECHARGEABLE LITHIUM BATTERY COMPRISING SAME

(71) Applicant: SAMSUNG SDI CO., LTD., Yongin-si (KR)

(72) Inventors: Soojeong Lee, Yongin-si (KR); Young-Kee Kim, Yongin-si (KR); Dong-Hyun Shin, Yongin-si (KR); Sun-Il Park, Yongin-si (KR); Sujin Um, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 27 days.

(21) Appl. No.: 15/150,259

(22) Filed: May 9, 2016

(65) Prior Publication Data
US 2016/0344024 A1    Nov. 24, 2016

(30) Foreign Application Priority Data

May 19, 2015    (KR) .................... 10-2015-0069828

(51) Int. Cl.
*H01M 4/48* (2010.01)
*C01G 23/00* (2006.01)
(Continued)

(52) U.S. Cl.
CPC .......... *H01M 4/483* (2013.01); *C01G 23/005* (2013.01); *H01M 4/502* (2013.01); *H01M 4/625* (2013.01);
(Continued)

(58) Field of Classification Search
CPC ......... H01M 10/0431; H01M 10/0525; H01M 2004/028; H01M 4/483; H01M 4/502;
(Continued)

(56) References Cited

U.S. PATENT DOCUMENTS 8,334,072 B2    12/2012    Kim et al.
9,034,521 B2    5/2015    Lee et al.
(Continued)

FOREIGN PATENT DOCUMENTS

CN    101986445 A    3/2011
CN    102651470 A    8/2012
(Continued)

OTHER PUBLICATIONS

Nanofinder 30, Tokyo Instruments, Inc., pp. 1-10.*
(Continued)

*Primary Examiner* — Victoria H Lynch
(74) *Attorney, Agent, or Firm* — Lewis Roca Rothgerber Christie LLP

(57) ABSTRACT

A negative active material for a rechargeable lithium battery includes a lithium titanate compound represented by Chemical Formula 1, where R, a Raman spectrum intensity ratio (I(F2u)/I(F2g)) of an F2u peak in a range of about 200 $cm^{-1}$ to about 300 $cm^{-1}$ relative to an F2g peak in a range of about 400 $cm^{-1}$ to about 550 $cm^{-1}$ is greater than or equal to about 0.7.

$$Li_{4+x}Ti_{5-y}M_zO_{12-n} \quad \text{Chemical Formula 1}$$

In Chemical Formula 1, $-0.2 \leq x \leq 0.2$, $-0.3 \leq y \leq 0.3$, $0 \leq z \leq 0.3$, $-0.3 \leq n \leq 0.3$, and M is selected from Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As, and a combination thereof.

7 Claims, 3 Drawing Sheets

(51) Int. Cl.
  *H01M 4/50* (2010.01)
  *H01M 4/62* (2006.01)
  *H01M 10/04* (2006.01)
  *H01M 10/0525* (2010.01)
  *H01M 4/02* (2006.01)
(52) U.S. Cl.
  CPC ... *H01M 10/0431* (2013.01); *H01M 10/0525* (2013.01); *H01M 2004/027* (2013.01); *H01M 2004/028* (2013.01)
(58) Field of Classification Search
  CPC ............... H01M 4/625; H01M 10/052; H01M 2004/027; H01M 4/485; H01M 4/58
  See application file for complete search history.

(56) References Cited

U.S. PATENT DOCUMENTS

| | | | |
|---|---|---|---|
| 2011/0274973 A1* | 11/2011 | Sheem | H01M 4/364 429/220 |
| 2012/0104326 A1* | 5/2012 | Song | C01G 23/002 252/507 |
| 2013/0161558 A1 | 6/2013 | Kawamura et al. | |
| 2013/0288114 A1 | 10/2013 | An et al. | |
| 2014/0057173 A1 | 2/2014 | Jeong et al. | |

FOREIGN PATENT DOCUMENTS

| | | | | |
|---|---|---|---|---|
| CN | 102891303 A | | 1/2013 | |
| CN | 103378348 A | | 10/2013 | |
| CN | 103928667 A | * | 7/2014 | ........ H01M 10/0525 |
| CN | 103928667 A | | 7/2014 | |
| EP | 2595224 A1 | | 5/2013 | |
| JP | 2013-058313 A | | 3/2013 | |
| KR | 10-2008-0112977 A | | 12/2008 | |
| KR | 10-2011-0090026 A | | 8/2011 | |

OTHER PUBLICATIONS

Wu, Dongmei, Cheng, Yuanping, "Enhanced high-rate performance of sub-micro Li4Ti4.95Zn0.05O12 as anode material for lithium-ion batteries", Ionics (2013) 19:395-399. (Year: 2013).*
Scientific and Technical Information Center (STIC) report by W. Barham Jul. 20, 2017. (Year: 2017).*
Julien, C.M., et al. "Structural studies of Li4/3Me5/3O4 (Me=Ti, Mn) electrode materials: local structure and electrochemical aspects" Journal of Power Sources 136 (2004) 72-79 (Year: 2004).*
Machine Translation CN103928667A (Year: 2014).*
CN103928667A (in original Chinese) (Year: 2014).*
Yi et al., Ionics (2011) 17:799-803 (Year: 2011).*
Baddour-Hadjean et al., "Raman Microspectrometry Applied to the Study of Electrode Materials for Lithium Batteries," Chemical Reviews, vol. 110, No. 3, 2010, pp. 1278-1319.
EPO Extended Search Report dated Jul. 22, 2016, for corresponding European Patent Application No. 16170415.0 (7 pages).
Machine English Translation of JP 2013-058313 A, dated Mar. 28, 2013, 10 pages.
European Office Action for Application No. 16 170 415.0, dated Jan. 29, 2019, 4 pages.
Julien, C.M., et al., "Structural studies of Li4/3Me5/3O4 (Me=Ti, Mn) electrode materials: local structure and electrochemical aspects," Journal of Power Sources, vol. 136, 2004, 8 pages.
Chinese Office action, with English translation, dated Mar. 30, 2020, for corresponding Chinese Patent Application No. 201610334912.1 (18 pages).

* cited by examiner

NEGATIVE ACTIVE MATERIAL FOR RECHARGEABLE LITHIUM BATTERY AND RECHARGEABLE LITHIUM BATTERY COMPRISING SAME

CROSS-REFERENCE TO RELATED APPLICATION

This application claims priority to and the benefit of Korean Patent Application No. 10-2015-0069828 filed in the Korean Intellectual Property Office on May 19, 2015, the entire content of which is incorporated herein by reference.

BACKGROUND

1. Field

Embodiments of this disclosure relate to a negative active material for a rechargeable lithium battery and a rechargeable lithium battery including the same.

2. Description of the Related Art

Lithium rechargeable batteries have recently drawn attention as a power source for small portable electronic devices. The lithium rechargeable batteries use an organic electrolyte solution and thereby, have twice or more high discharge voltage than that of a battery using an alkali aqueous solution, and accordingly, lithium rechargeable batteries have high energy density.

The rechargeable lithium batteries are used as an energy source in various suitable fields, and research on their uses as an energy source for an electric vehicle has recently been conducted. For example, research on their uses for an ISG (Idle Stop & Go or Integrated Starter & Generator) system, widely used before the electric vehicle became commercially available, has actively been made. Accordingly, the rechargeable lithium batteries should have high input and output characteristics to be applied to the electric vehicle or the ISG system.

For positive active materials of a rechargeable lithium battery, lithium-transition element composite oxides being capable of intercalating lithium such as $LiCoO_2$, $LiMn_2O_4$, $LiNiO_2$, $LiNi_{1-x}Co_xO_2$ ($0<x<1$), and the like have been researched.

As for negative active materials, various suitable carbon-based materials being capable of intercalating/deintercalating lithium ions such as artificial graphite, natural graphite, and hard carbon, and oxides such as tin oxide or lithium vanadium-based oxide have been used. Recently, lithium titanate having a spinel structure (e.g., $Li_4Ti_5O_{12}$) shows high thermal stability, high reversibility and high efficiency characteristics and draws a large amount of attention.

SUMMARY

An aspect of an embodiment is directed toward a negative active material for a rechargeable lithium battery being capable of providing a battery having high rate capability.

An aspect of an embodiment is directed toward a rechargeable lithium battery including the negative active material.

According to an embodiment, a negative active material for a rechargeable lithium battery includes a lithium titanate compound represented by Chemical Formula 1, where R, a Raman spectrum intensity ratio (I(F2q)/I(F2u)) of F2g peak (about 400 cm$^{-1}$ to about 550 cm$^{-1}$) relative to F2u peak (about 200 cm$^{-1}$ to about 300 cm$^{-1}$) is greater than or equal to about 0.7.

$$Li_{4+x}Ti_{5-y}M_zO_{12-n} \qquad \text{Chemical Formula 1}$$

In Chemical Formula 1, $-0.2 \leq x \leq 0.2$, $-0.3 \leq y \leq 0.3$, $0 \leq z \leq 0.3$, $-0.3 \leq n \leq 0.3$, and M is selected from Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As, and a combination thereof.

In an embodiment, the R may be about 0.7 to about 1.

In an embodiment, the Raman spectrum may be measured using a laser light source.

According to an embodiment, a rechargeable lithium battery includes a negative electrode including a lithium titanate compound represented by Chemical Formula 1, where R, a Raman spectrum intensity ratio (I (F2g)/I (F2u)) of F2g peak (about 400 cm$^{-1}$ to about 550 cm$^{-1}$) relative to F2u peak (about 200 cm$^{-1}$ to about 300 cm$^{-1}$) is greater than or equal to about 0.7; a positive electrode including a positive active material; and an electrolyte.

$$Li_{4+x}Ti_{5-y}M_zO_{12-n} \qquad \text{Chemical Formula 1}$$

In Chemical Formula 1, $-0.2 \leq x \leq 0.2$, $-0.3 \leq y \leq 0.3$, $0 \leq z \leq 0.3$, $-0.3 \leq n \leq 0.3$, and M is selected from Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As, and a combination thereof.

The positive active material may include a compound represented by Chemical Formula 2, a compound represented by Chemical Formula 3, a compound represented by Chemical Formula 4, or a mixture thereof.

$$Li_xTO_{2-z}L_z \qquad \text{Chemical Formula 2}$$

In Chemical Formula 2, T may be $M'_{1-k}A_k$ (M' is $Ni_{1-d-e}Mn_dCo_e$, $0.65 \leq d+e \leq 0.85$, $0.1 \leq e \leq 0.4$, A is a dopant, and $0 \leq k < 0.05$). The dopant may be selected from B, Ca, Zr, S, F, P, Bi, Al, Mg, Zn, Sr, Cu, Fe, Ga, In, Cr, Ge, and Sn.

In Chemical Formula 2, L may be selected from F, S, P and a combination thereof, $x \leq 1.05$, and $0 \leq z \leq 2$.

$$Li_{a2}Mn_{1-b2}Q_{b2}O_{4-\alpha 2} \qquad \text{Chemical Formula 3}$$

In Chemical Formula 3, $0.90 \leq a2 \leq 1.8$, $0 \leq b2 \leq 0.5$, $0 \leq \alpha 2 < 2$, and Q is selected from Mg, La, Tb, Gd, Ce, Pr, Nd, Sm, Ba, Sr, Ca, and a combination thereof.

$$Li_{a3}Mn_{1-b3}G_{b3}O_{2-\alpha 3} \qquad \text{Chemical Formula 4}$$

In Chemical Formula 4, $0.90 \leq a3 \leq 1.8$, $0 < b3 \leq 0.5$, $0 \leq \alpha 3 \leq 5$ 2, and G is selected from Mg, La, Tb, Gd, Ce, Pr, Nd, Sm, Ba, Sr, Ca, and a combination thereof.

In an embodiment, the positive electrode may further include activated carbon. The positive active material and the activated carbon may be mixed at a ratio of 99:1 wt % to 89:11 wt %.

Embodiments are described in the following detailed description.

A negative active material for a rechargeable lithium battery according to an aspect of an embodiment may be directed toward a rechargeable lithium battery having high rate capability.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Figure 1:
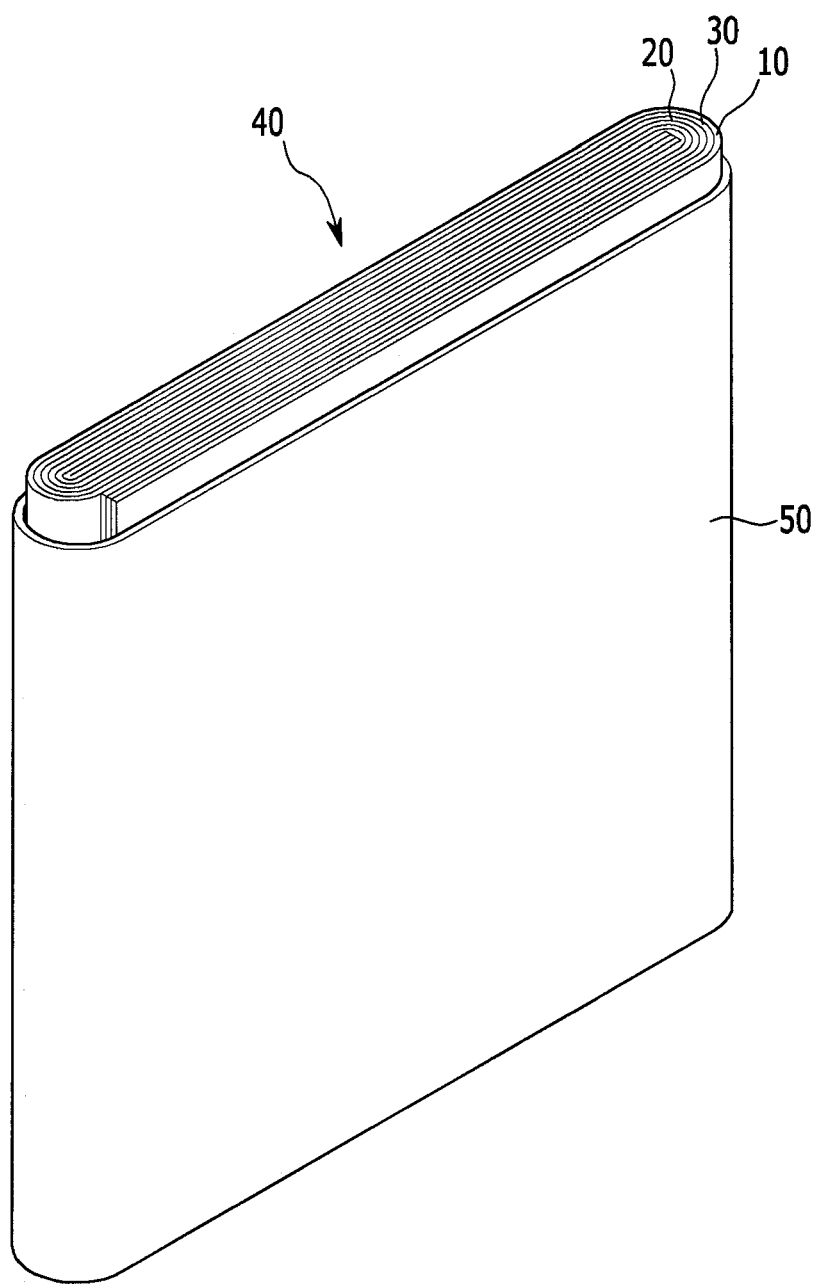
FIG. 1 is a schematic view showing a structure of a rechargeable lithium battery according to an embodiment.

Hereinafter, embodiments are described in more detail. However, these embodiments are examples, and this disclosure is not limited thereto. Also, in the context of the present application, when a first element is referred to as being "on" a second element, it can be directly on the second element or be indirectly on the second element with one or more intervening elements interposed therebetween.

A negative active material for a rechargeable lithium battery according to an embodiment includes a lithium titanate compound represented by Chemical Formula 1.

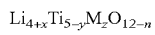 Chemical Formula 1

$Li_{4+x}Ti_{5-y}M_zO_{12-n}$

In Chemical Formula 1, −0.2≤x≤0.2, −0.3≤y≤0.3, 0≤z≤0.3, −0.3≤n≤0.3, and

M is selected from Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As, and a combination thereof.

The lithium titanate compound represented by Chemical Formula 1 is a compound in which a lithium ion is positioned at a tetrahedral site (8a) or a half octahedral site (½, 16c). This lithium titanate compound shows that the lithium ion positioned at the tetrahedral site or half octahedral site is transferred into an octahedral site (16c or 16d) during a charge process when lithium is intercalated. For example, in some embodiments, the lithium ion is at the tetrahedral site (8a) or the half octahedral site (½, 16c) of a cubic close-packed structure prior to charging and migrates to the octahedral site (16c or 16d) of the cubic close-packed structure during the charging process.

In embodiments of the lithium titanate compound, when the lithium ion transition easily occurs, charge and discharge of a battery is more actively performed, and thus, high-rate charge and discharge characteristics may be improved. The lithium ion transition into the octahedral site (e.g., the octahedral site 16c or 16d) may more easily occur when the lithium ion is positioned at the half octahedral site (e.g., the half octahedral site (½, 16c)) than when the lithium ion is positioned at the tetrahedral site (8a). Accordingly, an embodiment provides an active material improving high-rate charge and discharge characteristics by adjusting lattice positions of a lithium ion included in a lithium titanate compound to promote insertion of the lithium ion (e.g., intercalation and deintercalation of the lithium ion).

The negative active material including the lithium titanate compound represented by Chemical Formula 1 according to an embodiment have R, a Raman spectrum intensity ratio (I(F2g)/I(F2u)) of the intensity of the F2g peak (about 400 cm$^{-1}$ to about 550 cm$^{-1}$) in the Raman spectrum relative to the intensity of the F2u peak (about 200 cm$^{-1}$ to about 300 cm$^{-1}$) in the Raman spectrum of greater than or equal to about 0.7, for example about 0.7 to about 1. In an embodiment, R (the Raman spectrum intensity ratio (I(F2g)/I(F2u)) of the lithium titanate compound) may be about 0.7 to about 0.8.

The F2u peak in the Raman spectrum is caused by (or corresponds to) a lithium ion positioned at a half octahedral site, and the F2g peak in the Raman spectrum is caused by (or corresponds to) a lithium ion positioned at a tetrahedral site. Accordingly, a ratio of the lithium ions positioned at the tetrahedral site to the lithium ions positioned at the half octahedral site may be determined from R of the Raman spectrum intensity ratio (I (F2g)/I (F2u)) of the lithium titanate compound.

Herein, when the R is greater than or equal to about 0.7, a lithium ion is suitably or appropriately positioned at a half octahedral site (e.g., the octahedral site (½, 16c)) from which the lithium ion is easily transferred to the octahedral site (e.g., the octahedral site (16c or 16d)) and thus, may show excellent high-rate charge and discharge characteristics. For example, high-rate charge and discharge characteristics may be further obtained (or further improved) when the R is in a range of about 0.7 to about 1.

The Raman spectrum is measured by using a laser light source, and in some embodiments, the laser light source may be a laser having a wavelength of (e.g., ranging from) about 514 nm to about 622 nm. For example, the laser light source may emit light having a wavelength of about 514 nm to about 622 nm. A peak intensity ratio of the Raman spectrum indicates a peak height ratio.

According to an embodiment, a method of manufacturing the negative active material is as follows.

A lithium raw material and a titanium raw material are mixed to obtain a mixture. This mixing process may be performed through ball-milling, or bead-milling. During the mixing process, an M raw material (M is selected from Li, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As and a combination thereof) may be further added thereto.

The lithium raw material may be lithium carbonate, lithium hydroxide, or a combination (e.g., mixture) thereof. The titanium raw material may be titanium oxide, titanium hydroxide, titanium nitrate, or a combination (e.g., mixture) thereof. When the M raw material is further used, an oxide including M, a hydroxide including M, a nitrate including M, or a combination (e.g., a mixture) thereof may be used as the M raw material.

A mixing ratio in the mixing process may be suitably or appropriately adjusted in a range capable of obtaining a composition of Chemical Formula 1.

The mixture is primarily heat-treated, obtaining a primarily heat-treated product. The primary heat treatment process may be performed at a temperature of (e.g., ranging from) about 100° C. to about 500° C. for about 1 hour to about 24 hours. When the primary heat treatment is performed in the foregoing temperature range, a product having a suitably or appropriately developed crystal structure (e.g., a structure having a lithium ion suitably or desirably positioned at a half octahedral site) and a suitable or appropriate particle size may be obtained. For example, when the primary heat treatment is performed at a temperature of the foregoing range for a time period of the foregoing range, an active material having a suitable or desired R value may be prepared.

Subsequently, the primarily heat-treated product is secondarily heat-treated, preparing a negative active material of Chemical Formula 1.

The secondary heat treatment may be performed at about 600° C. to about 1000° C. Without being limited by any particular mechanism or theory, this secondary heat treatment is performed to improve crystalline (e.g., to increase the crystallinity of the negative active material) and to remove a side product (e.g., to reduce an amount of the side product), and when the secondary heat treatment is performed in the foregoing temperature range, crystalline of a particle (e.g., the crystallinity of the particle) is further improved without overgrowing of the particle, while a side product is effectively or substantially removed.

An embodiment provides a rechargeable lithium battery including the negative active material. The rechargeable lithium battery includes a negative electrode including the negative active material; a positive electrode including a positive active material; and an electrolyte.

In an embodiment, the positive active material may include a compound represented by Chemical Formula 2, a compound represented by Chemical Formula 3, a compound represented by Chemical Formula 4, or a mixture thereof.

$$Li_xTO_{2-z}L_z \qquad \text{Chemical Formula 2}$$

In Chemical Formula 2, T may be $M'_{1-k}A_k$ (where M' is $Ni_{1-d-e}Mn_dCo_e$, $0.65 \le d+e \le 0.85$, $0.1 \le e \le 0.4$, A is a dopant, and $0 \le k < 0.05$). In an embodiment, the dopant (A) may be selected from B, Ca, Zr, S, F, P, Bi, Al, Mg, Zn, Sr, Cu, Fe, Ga, In, Cr, Ge, and Sn.

L may be selected from F, S, P and a combination thereof, $x \le 1.05$, and
$0 \le z \le 2$.

$$Li_{a2}Mn_{1-b2}Q_{b2}O_{4-\alpha2} \qquad \text{Chemical Formula 3}$$

In Chemical Formula 3, $0.90 \le a2 \le 1.8$, $0 \le b2 \le 0.5$, $0 \le \alpha2 < 2$, and Q is selected from Mg, La, Tb, Gd, Ce, Pr, Nd, Sm, Ba, Sr, Ca, and a combination thereof.

$$Li_{a3}Mn_{1-b3}G_{b3}O_{2-\alpha3} \qquad \text{Chemical Formula 4}$$

In Chemical Formula 4, $0.90 \le a3 \le 1.8$, $0 < b3 \le 0.5$, $0 \le \alpha3 \le 2$, and G is selected from Mg, La, Tb, Gd, Ce, Pr, Nd, Sm, Ba, Sr, Ca, and a combination thereof.

In an embodiment, the positive electrode may further include activated carbon. In some embodiments, the positive active material and the activated carbon may be mixed at a ratio of 99:1 wt % to 89:11 wt % (positive active material: activated carbon). When the positive electrode furtherer includes the activated carbon, high rate charge effect of a rechargeable lithium battery may be more effectively obtained. In addition, when the positive active material and the activated carbon are used within the foregoing mixing ratio range, an excellent high rate charge effect may be obtained without a negative influence on a battery.

In an embodiment, the positive electrode includes a positive active material layer including the positive active material and a current collector supporting the positive active material layer.

The positive active material layer may further include a binder and a conductive material.

An amount of the positive active material may be about 90 wt % to about 98 wt % based on the total weight of the positive active material layer.

The binder and conductive material may be respectively included in an amount of (e.g., ranging from) about 1 wt % to about 5 wt % based on the total weight of the positive active material layer. For example, the binder and the conductive material may each independently be included in the positive active material layer in an amount of about 1 wt % to about 5 wt %.

The binder improves binding properties of positive active material particles with one another and with the current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material provides an electrode having conductivity. Any suitable electrically conductive material may be used as a conductive material unless it causes an undesirable chemical change in the rechargeable lithium battery or its components. Examples of the conductive material include a carbon-based material such as natural graphite, artificial graphite, carbon black, acetylene black, ketjen black, a carbon fiber, and the like; a metal-based material such as metal powder or metal fiber including copper, nickel, aluminum, silver, and the like; a conductive polymer such as polyphenylene derivative, or a mixture thereof (a mixture of any of the foregoing conductive materials).

The current collector may be Al, but the current collector is not limited thereto.

In an embodiment, the negative electrode includes a negative active material layer including the negative active material and the negative active material active material layer includes a binder, and may further optionally include a conductive material. The negative active material layer may include about 1 wt % to about 5 wt % of the binder based on the total weight of the negative active material layer. When the negative active material layer includes the conductive material, the negative active material layer includes about 90 wt % to about 98 wt % of the negative active material, about 1 wt % to about 5 wt % of the binder, and about 1 wt % to about 5 wt % of the conductive material based on the total weight of the negative active material layer.

The binder improves binding properties of negative active material particles with one another and with a current collector. The binder includes a non-water-soluble binder, a water-soluble binder, or a combination (e.g., mixture) thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination (e.g., mixture) thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination (e.g., mixture) thereof. The polymer resin binder may be selected from polytetrafluoroethylene, polyethylene, polypropylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonatedpolyethylene, a latex, a polyester resin, an acrylic resin, a phenolic resin, an epoxy resin, polyvinyl alcohol, and a combination (e.g., mixture) thereof.

When the water-soluble binder is used as a negative electrode binder, a cellulose-based compound may be further used (e.g., included) to provide viscosity (e.g., to improve viscosity). The cellulose-based compound includes one or more of carboxylmethyl cellulose, hydroxypropylmethyl cellulose, methyl cellulose, or alkali metal salts thereof. The alkali metal may be Na, K, or Li. Such a thickener (the cellulose-based compound) may be used in an amount of (e.g., ranging from) about 0.1 parts by weight to about 3 parts by weight based on 100 parts by weight of the negative active material.

The conductive material is included to improve electrode conductivity. Any suitable electrically conductive material may be used as a conductive material unless it causes an undesirable chemical change in the rechargeable lithium battery or its components. Examples of the conductive material include a carbon-based material such as natural graphite, artificial graphite, carbon black, acetylene black, ketjen black, a carbon fiber, and the like; a metal-based material of metal powder or metal fiber including copper, nickel, aluminum, silver, and the like; conductive polymers such as polyphenylene derivatives; or a mixture thereof.

The current collector may be selected from a copper foil, a nickel foil, a stainless steel foil, a titanium foil, a nickel foam, a copper foam, a polymer substrate coated with a conductive metal, and a combination thereof.

The negative electrode and the positive electrode may be manufactured by a method including mixing an active material, a conductive material, and a binder into an active material composition and coating the composition on a current collector. The electrode manufacturing method may be any suitable method generally available in the art, and thus it is not necessary to describe the manufacturing method in more detail in the present specification. When the non-water-soluble binder is used in a negative electrode, the solvent may be an organic solvent such as N-methylpyrrolidone, while when the water-soluble binder is used, the solvent may be water.

The electrolyte may be an organic electrolyte solution (organic liquid electrolyte), or a solid electrolyte.

In some embodiments, the organic electrolyte solution includes an organic solvent and a lithium salt.

The organic solvent serves as a medium for transmitting ions taking part in the electrochemical reaction of a battery.

The organic solvent may include one selected from a carbonate-based solvent, an ester-based solvent, an ether-based solvent, a ketone-based solvent, an alcohol-based solvent, and an aprotic solvent. The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like, and the ester based solvent may include methyl acetate, ethyl acetate, n-propyl acetate, dimethylacetate, methylpropionate, ethylpropionate, γ-butyrolactone, decanolide, valerolactone, mevalonolactone, and/or caprolactone. The ether-based solvent may include dibutyl ether, tetraglyme, diglyme, dimethoxyethane, 2-methyltetrahydrofuran, tetrahydrofuran, and/or the like, and the ketone-based solvent may include cyclohexanone. The alcohol-based solvent may include ethyl alcohol, isopropyl alcohol, and/or the like, and examples of the aprotic solvent may include nitriles such as R—CN (where R is a C2 to C20 linear, branched, or cyclic hydrocarbon that may include a double bond, an aromatic ring, and/or an ether bond), amides such as dimethylformamide, dioxolanes such as 1,3-dioxolane, sulfolanes, and/or the like.

The organic solvent may be used singularly or in a mixture. When the organic solvent is used in a mixture, the mixture ratio may be controlled in accordance with a suitable or desirable battery performance.

The carbonate-based solvent may include a mixture with a cyclic carbonate and a linear carbonate. In some embodiments, the cyclic carbonate and the linear carbonate are mixed together to a volume ratio of about 1:1 to about 1:9. When the mixture is used as an electrolyte, it may have enhanced performance.

In addition, the non-aqueous organic electrolyte may further include an aromatic hydrocarbon-based solvent as well as the carbonate-based solvent. The carbonate-based solvents and the aromatic hydrocarbon-based solvents may be mixed together to a volume ratio of about 1:1 to about 30:1.

The aromatic hydrocarbon-based organic solvent may be represented by the following Chemical Formula 5.

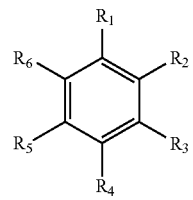

Chemical Formula 5

In Chemical Formula 5, $R_1$ to $R_6$ are the same or different and are each independently selected from hydrogen, a halogen, a C1 to C10 alkyl group, a haloalkyl group, and a combination thereof.

The aromatic hydrocarbon-based organic solvent may include one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene and a combination (e.g., mixture) thereof.

The electrolyte may further include vinylene carbonate and/or an ethylene carbonate-based compound represented by Chemical Formula 6 to improve cycle life.

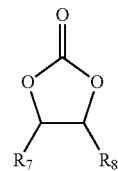

Chemical Formula 6

In Chemical Formula 6, $R_7$ and $R_8$ are each independently hydrogen, a halogen, a cyano (CN) group, a nitro ($NO_2$) group, or a C1 to C5 fluoroalkyl group, provided that at least one of $R_7$ and $R_8$ is a halogen, a nitro ($NO_2$) group, or a C1 to C5 fluoroalkyl group, and $R_7$ and $R_8$ are not simultaneously hydrogen (e.g., $R_7$ and $R_8$ are not both hydrogen).

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate or fluoroethylene carbonate. The amount of the additive for improving cycle life may be flexibly used in a suitable or appropriate range.

The lithium salt is dissolved in an organic solvent, supplies a battery with lithium ions, basically operates (e.g., facilitates operation of) the rechargeable lithium battery, and improves transportation of the lithium ions between positive and negative electrodes. Such a lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g. an integer of 1 to 20), LiCl, LiI, and $LiB(C_2O_4)_2$ (lithium bis(oxalato) borate; LiBOB). The lithium salt may be used in a concentration of (e.g., ranging from) about 0.1 M to about 2.0 M. When the lithium salt is included at the above concentration range, an electrolyte may have excellent performance and lithium ion mobility due to optimal electrolyte conductivity and viscosity.

The solid electrolyte may include, for example, boron oxide, lithium oxynitride, and/or the like. The solid electrolyte may be, for example, formed on the negative electrode by a sputtering method.

The rechargeable lithium battery may further include a separator between the negative electrode and the positive electrode, as needed or desired. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The filler may include, for example, a glass fiber.

In general, rechargeable lithium batteries may be classified as lithium ion batteries, lithium ion polymer batteries, and lithium polymer batteries according to the presence of a separator and the kind of an electrolyte used in the batteries. The rechargeable lithium batteries may have various suitable shapes and sizes and for example, may include cylindrical, prismatic, or coin-type (or kind of) batteries and also, thin film or rather bulky batteries. Structures and manufacturing methods for lithium ion batteries pertaining to this disclosure may be any suitable structures and/or manufacturing methods generally available in the art.

The rechargeable lithium battery may be used for a laptop, a smart phone, an electric vehicle, a power storage system in a power plant and/or the like.

FIG. 1 schematically shows a representative structure of a rechargeable lithium battery according to an embodiment of the present disclosure. As shown in FIG. 1, a rechargeable lithium battery 100 may include an electrode assembly 40 obtained by interposing a separator 30 between a positive electrode 10 and a negative electrode 20 and spirally winding them, and may include a case 50 in which the electrode assembly 40 is housed. The positive electrode 10, the negative electrode 20 and the separator 30 may be impregnated in (e.g., with) an electrolyte solution.

Hereinafter, some embodiments are described in more detail with reference to examples. However, the present disclosure is not limited to the examples.

Example 1

$TiO_2$ and $Li_2CO_3$ were mixed to a mole ratio of 5:4.05 ($TiO_2:Li_2CO_3$) and ball-milled, thereby preparing a mixture. The mixture was primarily heat-treated at 400° C. for 12 hours and then, secondarily heat-treated at 750° C., thereby preparing a $Li_4Ti_5O_{12}$ negative active material.

Figure 2:
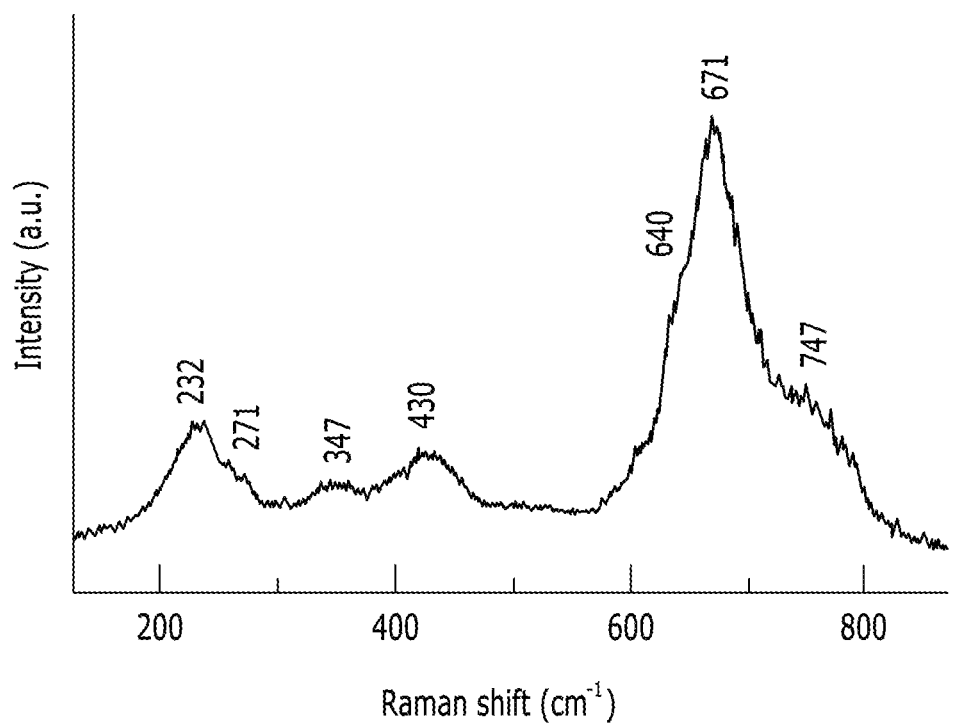
FIG. 2 is a graph showing a Raman spectrum measurement result of a negative active material according to Example 1.

A Raman spectrum of the obtained negative active material (the $Li_4Ti_5O_{12}$ negative active material) was measured utilizing a Raman spectrometer (NRS-100 made by JASCO Analytical Instruments) by using a laser light source having a wavelength of 514 nm. The results are shown in FIG. 2. In the obtained Raman spectrum shown in FIG. 2, R of a Raman spectrum intensity ratio, l(F2g)/I(F2u)) of an F2g peak (430 cm$^{-1}$, a peak derived from a lithium ion positioned at a tetrahedral site) relative to an F2u peak (232 cm$^{-1}$, a peak derived from a lithium ion positioned in a half octahedral site) was calculated and is shown in the following Table 1.

Then, 89 wt % of the prepared negative active material (the $Li_4Ti_5O_{12}$ negative active material), 6 wt % of a polyvinylidene fluoride binder and 5 wt % of a carbon black conductive material were mixed in an N-methyl pyrrolidone solvent to prepare a negative active material composition, and this negative active material composition was coated on a Cu current collector and then, dried and compressed in a common process, thereby manufacturing a negative electrode. The Raman spectrum of the negative electrode was measured using the same method as the method of measuring that of the negative active material, and the results are shown in the following Table 1.

A positive electrode was manufactured by mixing 85 wt % of a $LiNi_{1/3}Co_{1/3}Mn_{1/3}O_2$ positive active material, 6 wt % of a polyvinylidene fluoride binder, 4 wt % of a carbon black conductive material and 5 wt % of an activated carbon conductive material in an N-methyl pyrrolidone solvent to prepare a positive active material composition, coating the positive active material composition on an Al current collector and then, drying and compressing it in a common process.

The positive and negative electrodes and an electrolyte solution were used to manufacture a 50 mAh pouch battery. Herein, the electrolyte solution was prepared by dissolving 1M $LiPF_6$ in a mixed solvent of ethylene carbonate and dimethylcarbonate (50:50 volume ratio of ethylene carbonate and dimethylcarbonate).

Example 2

A negative active material was prepared according to the same method as described with respect to Example1 except for performing the primary heat treatment for 9 hours instead of 12 hours. The Raman spectrum of the negative active material was measured using the same method as described with respect to Example 1, and R obtained from the result is shown in the following Table 1.

The negative active material was used according to the same method as described with respect to Example 1 for manufacturing a rechargeable lithium battery cell. In addition, the Raman spectrum of the resultant negative electrode was measured according to the same method as the method of measuring that of the negative active material, and the result is shown in the following Table 1.

Example 3

A negative active material was prepared according to the same method as described with respect to Example 1 except for performing the primary heat treatment for 3 hours instead of 12 hours. The Raman spectrum of the negative active material was measured according to the same method as described with respect to Example 1, and R obtained from the result is shown in the following Table 1.

The negative active material was used in the same method as described with respect to Example 1 for manufacturing a rechargeable lithium battery cell. In addition, the Raman spectrum of the resultant negative electrode was measured according to the same method as the method of measuring that of the negative active material, and the result is shown in the following Table 1.

Example 4

A negative active material was prepared according to the same method as described with respect to Example 1 except for performing the primary heat treatment for 6 hours instead of 12 hours. The Raman spectrum of the negative active material was measured using the same method as described with respect to Example 1, and R obtained from the result is shown in the following Table 1.

The negative active material was used according to the same method as described with respect to Example 1 for manufacturing a rechargeable lithium battery cell. In addition, the Raman spectrum of the resultant negative electrode was measured using the same method as the method of measuring that of the negative active material, and the result is shown in the following Table 1.

Example 5

A positive electrode was manufactured by mixing 85 wt % of a $LiNi_{1/3}Co_{1/3}Mn_{1/3}O_2$ positive active material, 6 wt % of a polyvinylidene fluoride binder, and 9 wt % of a carbon black conductive material in an N-methyl pyrrolidone solvent to prepare a positive active material composition, coating the positive active material composition on an Al current collector and then, drying and compressing it in a common process.

The positive electrode, the negative electrode according to Example 1 and an electrolyte solution were used to manufacture a 50 mAh pouch battery cell. Herein, the electrolyte solution was prepared by dissolving 1M $LiPF_6$ in a mixed solvent of ethylene carbonate and dimethylcarbonate (50:50 volume ratio of ethylene carbonate and dimethylcarbonate).

Comparative Example 1

$TiO_2$ and $Li_2CO_3$ were mixed to a mole ratio of 5:4.05 ($TiO_2$:$Li_2CO_3$) and ball-milled, thereby preparing a mixture. The mixture was heat-treated at 750° C., thereby preparing a $Li_4Ti_5O_{12}$ negative active material. The Raman spectrum of the negative active material was measured using the same method as described with respect to Example 1, and R obtained from the result is shown in the following Table 1.

The negative active material was used according to the same method as described with respect to Example 1 to manufacture a rechargeable lithium battery cell. In addition, the Raman spectrum of the resultant negative electrode was measured according to the same method as the method of measuring that of the negative active material, and the result is shown in the following Table 1.

Comparative Example 2

$LiOH.H_2O$ and $Ti(OC_4H_9)_4$ were mixed to a mole ratio of 4:5 ($LiOH.H_2O$:$Ti(OC_4H_9)_4$) in an ethanol solvent. Then, LiOH in an amount of 2 mol/L was added thereto in a dropwise, the resulting mixture was agitated for 30 minutes and reacted in an autoclave at 180° C. for 24 hours. The obtained reaction products were calcinated at 700° C., thereby preparing a negative active material.

The Raman spectrum of the negative active material was measured using the same method as described with respect to Example 1, and R obtained from the result is shown in the following Table 1.

The negative active material was used in the same method as described with respect to Example 1 for manufacturing a rechargeable lithium battery cell. In addition, the Raman spectrum of the resultant negative electrode was measured, and the result is shown in the following Table 1.

The rechargeable lithium battery cells according to Examples 1 to 5 and Comparative Examples 1 to 2 were respectively once charged and discharged with 1 C (e.g., charged and discharged at 1 C) and then, once with 50 C (e.g., charged and discharged at 50 C), and their ratios (%) of 50 C charge capacity relative to 1 C charge capacity were measured and are respectively shown in the following Table 1 and FIG. 3.

TABLE 1

|  | R (active material) | R (electrode) | high-rate charge characteristics (%, 50 C/1 C) |
|---|---|---|---|
| Example 1 | 0.7450 | 0.738 | 82 |
| Example 2 | 0.7201 | 0.7211 | 80 |
| Example 3 | 0.7010 | 0.7009 | 79 |
| Example 4 | 0.7053 | 0.7066 | 80 |
| Example 5 | 0.7450 | 0.738 | 80.8 |
| Comparative Example 1 | 0.6771 | 0.6734 | 58 |
| Comparative Example 2 | 0.6911 | 0.6904 | 77 |

Figure 3:
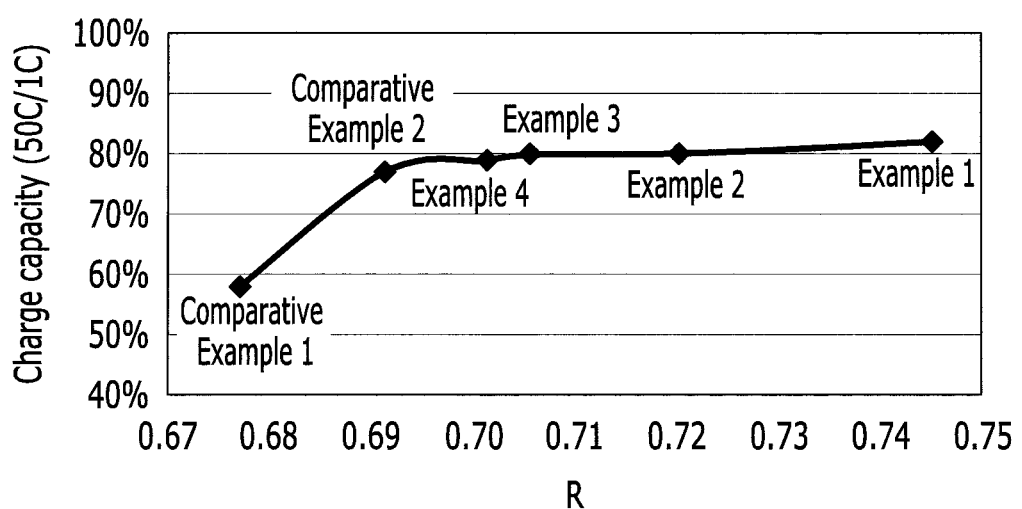
FIG. 3 is a graph showing high-rate charge characteristics of negative active materials according to Examples 1 to 4 and Comparative Examples 1 to 2.

As shown in Table 1 and FIG. 3, the battery cells including a negative active material having R of greater than or equal to 0.7 according to Examples 1 to 5 showed excellent high-rate charge characteristics as compared with the battery cells including a negative active material having R of less than 0.7 according to Comparative Examples 1 and 2.

As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a), and 35 U.S.C. § 132(a). As used herein, the terms "use," "using," and "used" may be considered synonymous with the terms "utilize," "utilizing," and "utilized," respectively.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be examples and should not be construed as limiting the present invention.

What is claimed is:

1. A negative active material for a rechargeable lithium battery, the negative active material comprising:

a lithium titanate compound represented by Chemical Formula 1, wherein R, a Raman spectrum intensity ratio (I(F2g)/I(F2u)) of an F2g peak in a range of about 400 cm$^{-1}$ to about 550 cm$^{-1}$ relative to an F2u peak in a range of about 200 cm$^{-1}$ to about 300 cm$^{-1}$ in a Raman spectrum, is about 0.7 to 0.7450, wherein the Raman spectrum comprises an additional peak having an intensity higher than that of the F2u peak:

$$Li_{4+x}Ti_{5-y}M_zO_{12-n} \quad \text{Chemical Formula 1}$$

wherein, in Chemical Formula 1, $-0.2 \le x \le 0.2$, $-0.3 \le y \le 0.3$, $0 < z \le 0.3$, $-0.3 \le n \le 0.3$, and M is selected from the group consisting of Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As, and a combination thereof.

2. The negative active material of claim 1, wherein the Raman spectrum is measured using a laser light source.

3. A rechargeable lithium battery comprising:

a negative electrode comprising a lithium titanate compound represented by Chemical Formula 1, wherein R, a Raman spectrum intensity ratio (I(F2g)/I(F2u)) of an F2g peak in a range of about 400 cm$^{-1}$ to about 550 cm$^{-1}$ relative to an F2u peak in a range of about 200 cm$^{-1}$ to about 300 cm$^{-1}$ in a Raman spectrum is about 0.7 to 0.7450, wherein the Raman spectrum comprises an additional peak having an intensity higher than that of the F2u peak;

a positive electrode comprising a positive active material; and an electrolyte:

$$Li_{4+x}Ti_{5-y}M_zO_{12-n} \quad \text{Chemical Formula 1}$$

wherein, in Chemical Formula 1, $-0.2 \le x \le 0.2$, $-0.3 \le y \le 0.3$, $0 < z \le 0.3$, $-0.3 \le n \le 0.3$, and M is selected from the group consisting of Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, As, and a combination thereof.

4. The rechargeable lithium battery of claim 3, wherein the positive active material comprises a compound represented by Chemical Formula 2, a compound represented by Chemical Formula 3, a compound represented by Chemical Formula 4, or a mixture thereof:

$$Li_xTO_{2-z}L_z \quad \text{Chemical Formula 2}$$

wherein, in Chemical Formula 2, T is M'$_{1-k}$A$_k$, M' is Ni$_{1-d-e}$Mn$_d$O$_e$, $0.65 \le d+e \le 0.85$, $0.1 \le e \le 0.4$, A is a dopant, $0 \le k < 0.05$, L is selected from the group consisting of F, S, P and a combination thereof, $0.95 \le x \le 1.05$, and $0 \le z \le 2$, $$Li_{a2}Mn_{1-b2}Q_{b2}O_{4-\alpha2} \quad \text{Chemical Formula 3}$$

wherein, in Chemical Formula 3, $0.90 \le a2 \le 1.8$, $0 \le b2 \le 0.5$, $0 \le \alpha2 < 2$, and Q is selected from Mg, La, Tb, Gd, Ce, Pr, Nd, Sm, Ba, Sr, Ca, and a combination thereof, $$Li_{a3}Mn_{1-b3}G_{b3}O_{2-\alpha3} \quad \text{Chemical Formula 4}$$

wherein, in Chemical Formula 4, $0.90 \le a3 \le 1.8$, $0 < b3 \le 0.5$, $0 \le \alpha3 \le 2$, and G is selected from Mg, La, Tb, Gd, Ce, Pr, Nd, Sm, Ba, Sr, Ca, and a combination thereof.

5. The rechargeable lithium battery of claim 4, wherein the dopant is selected from the group consisting of B, Ca, Zr, S, F, P, Bi, Al, Mg, Zn, Sr, Cu, Fe, Ga, In, Cr, Ge and Sn.

6. The rechargeable lithium battery of claim 3, wherein the positive electrode further comprises activated carbon.

7. The rechargeable lithium battery of claim 6, wherein the positive active material and the activated carbon are mixed to a ratio of 99:1 wt % to 89:11 wt %.

* * * * *

UNITED STATES PATENT AND TRADEMARK OFFICE
CERTIFICATE OF CORRECTION

| | | |
|---|---|---|
| PATENT NO. | : 10,847,793 B2 | Page 1 of 1 |
| APPLICATION NO. | : 15/150259 | |
| DATED | : November 24, 2020 | |
| INVENTOR(S) | : Soojeong Lee et al. | |

It is certified that error appears in the above-identified patent and that said Letters Patent is hereby corrected as shown below:

In the Claims

Column 14, Line 19, Claim 4    delete "$Ni_{1-d-e}Mn_dO_e$," and insert -- $Ni_{1-d-e}Mn_dCO_e$, --

Signed and Sealed this
Eighth Day of November, 2022

Katherine Kelly Vidal
*Director of the United States Patent and Trademark Office*